April 12, 1966 R. A. PENDLETON 3,245,594

MECHANICAL APPARATUS

Filed March 26, 1964 2 Sheets-Sheet 1

INVENTOR.
ROBERT A. PENDLETON
BY
Fred Jacob
ATTORNEY

April 12, 1966 R. A. PENDLETON 3,245,594

MECHANICAL APPARATUS

Filed March 26, 1964 2 Sheets-Sheet 2

INVENTOR.
ROBERT A. PENDLETON
BY
Fred Jacob
ATTORNEY

United States Patent Office 3,245,594
Patented Apr. 12, 1966

3,245,594
MECHANICAL APPARATUS

Robert A. Pendleton, Dedham, Mass., assignor to Honeywell Inc., a corporation of Delaware
Filed Mar. 26, 1964, Ser. No. 354,867
10 Claims. (Cl. 226—190)

The present invention relates in general to new and improved tape transports and in particular to magnetic tape transports.

In a magnetic tape transport, information is recorded on magnetic tape or read out therefrom as the tape is selectively moved past a magnetic head. If digital information is to be stored on tape, discrete groups of magnetic impulses, referred to as blocks of information, may be recorded. Upon readout, the data processing equipment with which the tape transport is associated, may call for the information blocks one at a time, or continuously. Similarly, the blocks may be recorded in a continuous stream or one block at a time.

The mechanism which controls the tape motion must, therefore, be flexible so that tape may be started and stopped repetitively, each such operation occurring in a relatively short time interval. The more rapidly such starting and stopping can be accomplished, the faster tape may be moved from a full stop to full speed, or from full speed to a full stop. Thus, the distance or spacing between individual blocks can be kept small and the storage capacity of the tape may be increased.

The problem of selectively moving tape past a magnetic head has been solved in various ways by prior art tape transports. In some of these transports which have achieved relatively high levels of performance, the tape movement is initiated by applying a force to the tape at right angles to its path to deflect it into engagement with the driving agency. The latter may consist of one or more rotating drive capstans against which the tape is selectively urged by the aforesaid force so as to impart motion thereto. In order to arrest the movement of the tape, the latter is deflected out of engagement with the drive means and into contact with a stationary brake.

Prior art tape transports which are capable of providing such performance rapidly and reliably, are relatively complex in construction and expensive to build. Frequently, the aforesaid tape deflection causes deformation of the tape—temporary or permanent—which adversely affects the performance of the transport by altering the spacing between the tape and the magnetic head.

Accordingly, it is the primary object of the present invention to provide a tape transport which overcomes the foregoing disadvantages.

It is another object of the present invention to provide a tape transport which is both simple in construction and reliable in operation.

It is a further object of the present invention to provide a magnetic tape transport which is simple and economical in construction and wherein tape deformation is utilized to enhance the reliability of data transfer.

The various novel features which characterize the invention are pointed out with particularly in the claims annexed to and forming a part of the specification. For a better understanding of the invention, its advantages and specific objects thereof, reference should be had to the following detailed description and accompanying drawings in which:

Figures 4A, 4B:
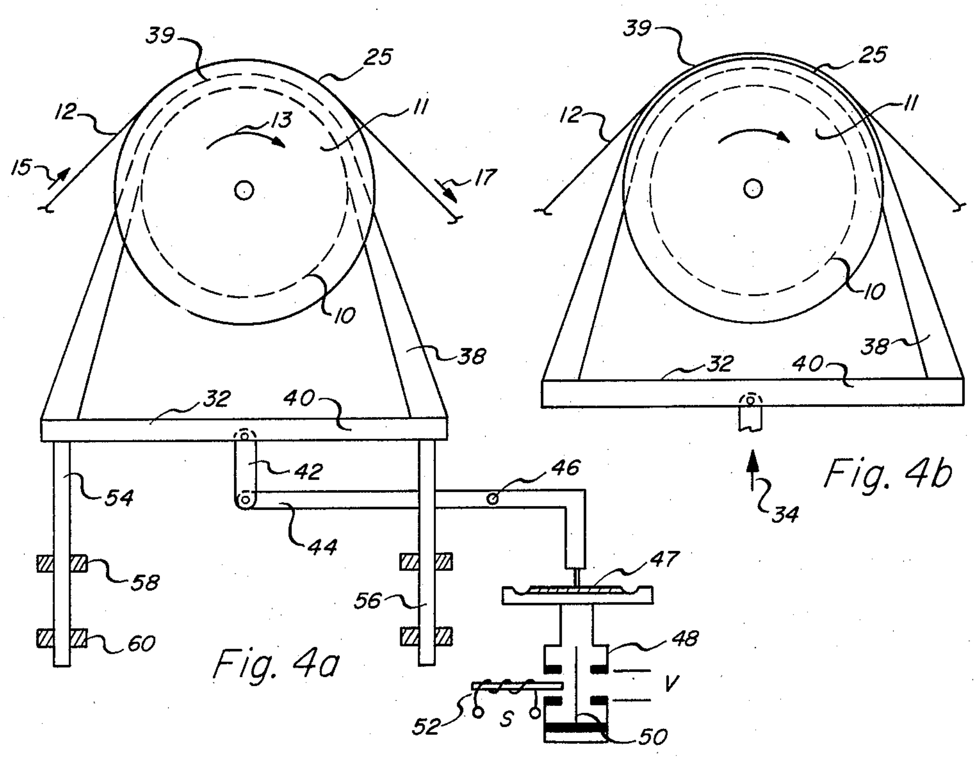
Figure 7:
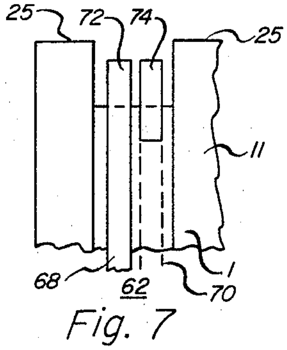
Figure 6A:
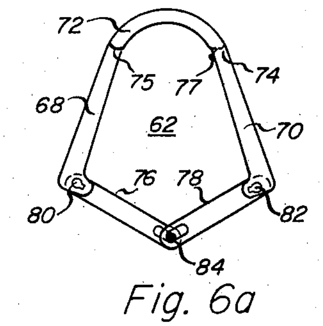
Figure 6B:
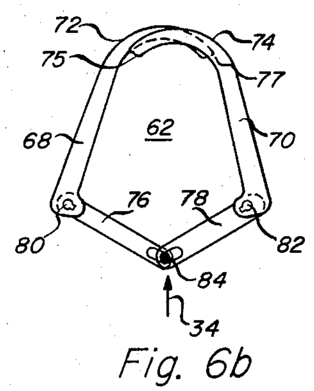
Figure 5:
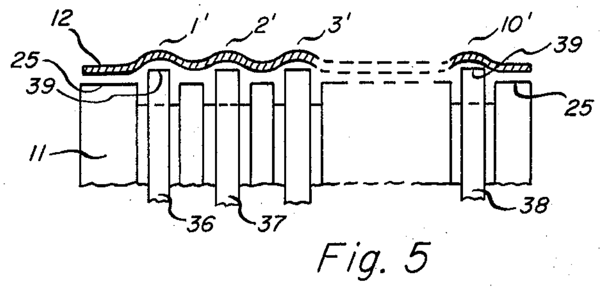

FIGURES 4*a* and 4*b* illustrate the driving and braking modes of the invention and actuating means therefor;

FIGURE 5 illustrates the tape deflection in the driving mode;

FIGURES 6*a* and 6*b* illustrate another embodiment of the brake members employed in the present invention; and FIGURE 7 illustrates the positioning of the brake members shown in FIGURE 6 relative to the capstan.

Figure 1:
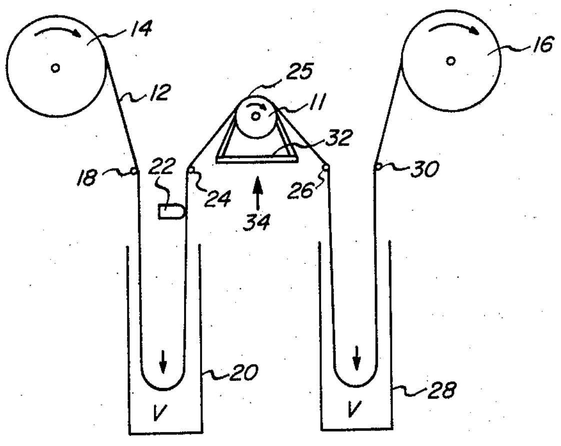
FIGURE 1 illustrates a preferred embodiment of the invention.

With reference now to the drawings, FIGURE 1 illustrates a uni-directional tape transport wherein a capstan 11 supplies the driving force to move the tape 12 from a supply reel 14 to a take-up reel 16. The tape coming off the supply reel 14, moves past the idler pulley 18 into a tape loop chamber 20. As indicated by the letter V, a vacuum is applied to the bottom portion of the loop chamber, so as to apply a force to the tape in the direction of the arrow shown. Upon leaving the loop chamber, the tape passes a magnetic head 22 and thence, by way of another idler pulley 24, over the drive capstan 11 where it engages a restricted area 25 of the surface of the rotating capstan. Following the capstan, the tape passes over an idler pulley 26 into a second loop chamber 28. A vacuum is applied to the loop chamber 28 to impart a force to the tape in the direction of the illustrated arrow. Upon leaving the loop chamber 28 the tape passes an idler pulley 30 and is wound onto the take-up reel 16.

The effect of the loop chambers 20 and 28 on both sides of the capstan 11, is to apply tension to the tape to bring the latter into intimate driving contact with the aforesaid capstan surface area 25. A brake 32 is positioned to surround the capstan and is adapted to have a force applied thereto in the direction of the arrow 34. As explained in greater detail hereinbelow, this force is transmitted to the tape 12 by the brake 32 to lift the tape off the capstan surface area 25, in opposition to the tension applied to the tape by the loop chambers 20 and 28.

Figures 2, 3:
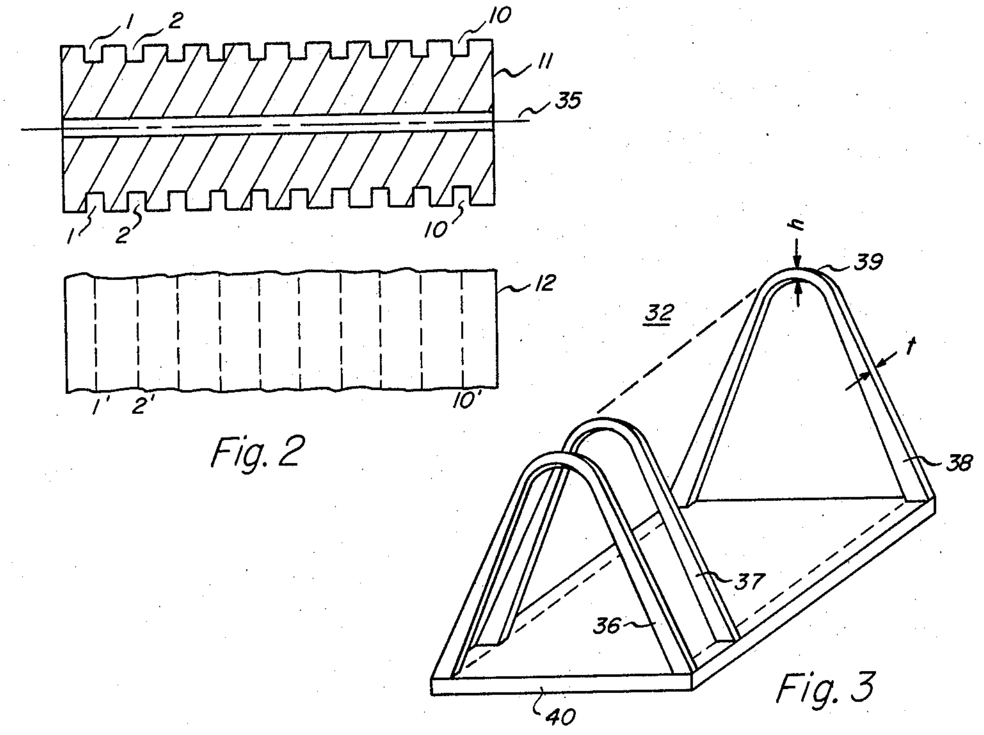
FIGURE 2 illustrates in greater detail a capstan used in the invention together with a section of tape corresponding thereto.
FIGURE 3 illustrates in greater detail the brake employed in the preferred embodiment of the invention.

FIGURE 2 shows a cross-sectional view of the capstan 11 which is seen to have a cylindrical configuration. The capstan includes circumferential grooves 1, 2 . . . 10, each lying in a plane normal to the capstan axis 35 and regularly spaced from each other by lands or raised areas. FIGURE 2 further illustrates a section of the tape 12 aligned with the capstan 11 in normal operating relationship. The tape has an equivalent number of information channels 1′, 2′ . . . 10′ whose center lines are indicated by dotted lines in the drawing. As shown, the channel centers are aligned with the centers of the corresponding circumferential capstan grooves.

FIGURE 3 illustrates in greater detail the brake 32 which is employed in the preferred embodiment of the invention. For a 10-channel tape, the brake comprises ten brake members such as the members 36, 37 . . . 38, only three being shown for the sake of simplicity. Each brake member is seen to have a generally U-shaped configuration, the closed end portion 39 of which has a height $h$ that is less than the depth of the circular grooves in the surface of the capstan 11. Similarly, the thickness $t$ of the brake members is less than the width of the aforesaid circumferential grooves. The open ends of the U-shaped brake members are fastened to a common base plate 40, as shown in FIGURE 3.

FIGURE 4*a* illustrates the invention in the tape driving mode. For the sake of clarity, only a single circumferential groove 10 of the capstan 11 is illustrated in which the brake member 38 is seen to be positioned. As previously explained, the height $h$ of the closed end portion of the brake member 38 is less than the depth of the groove 10 so that the brake member, in its reset position, is entirely submerged below the surface area 25. Thus, in the driving mode the tape 12 contacts the capstan area 25 without interference from the brake.

The base plate 40 is coupled to a link 42 which is, in turn, coupled to a lever 44 that is pivoted at point 46. The lever 44 is coupled to a flexible diaphragm 47 which forms the closure for a vacuum actuator 48. A vacuum is applied through an aperture as indicated by the letter V, while an oppositely positioned aperture is open to the atmosphere. A pivoted armature 50 is adapted to close one of the aforesaid apertures, as determined by the action of a solenoid 52 to which a switching signal S may be selectively applied. Four guide rods are fastened near the corners of the base plate 40, guide rods 54 and 56 being shown in the drawing. Each guide rod is slidably positioned in a pair of guides, such as the guides 58 and 60, which control the movement of the guide rod 54 and hence of the base plate.

In operation, the tape 12 is selectively driven past the magnetic head 22, as it progresses from the supply reel 14 along its path to the take-up reel 16 shown in FIGURE 1. The brake 32 is then in its normal rest position and the stationary brake member 38 rides within the groove of the capstan 11 below the surface area 25. The capstan is seen to rotate in a clockwise direction, as indicated by the arrow 13 in the drawing. In the drive mode, which is illustrated in FIGURE 4*a*, the position of the actuator armature 50 prevents a vacuum from being applied to the diaphragm 47. Owing to the action of the vacuum loop chambers 20 and 28, tension is applied to the tape 12 on both sides of the capstan 11 and the tape is urged into driving contact with the restricted capstan surface area 25. The motion of the capstan is thus imparted to the tape, as indicated by the arrows 15 and 17 in FIGURE 4*a*.

In the tape braking mode, a switching signal S is applied to the solenoid 52 which causes the armature to be attracted and to close the aperture that exhausts to the atmosphere. A vacuum is now applied to the diaphragm 47 which causes the latter to be deflected downward in FIGURE 4*a* and to rotate the lever 44 in a clockwise direction about its pivot 46. The brake 32 is thus moved upward in the drawing, as indicated by the arrow 34 in FIGURE 4*b*. As a consequence, the brake member 38, and hence its closed end portion 39, are now raised above the surface area 25 and the tape 12 is lifted out of contact with the rotating capstan 11. Since the vacuum loop chambers 20 and 28 continue to apply tension to the tape on both sides of the capstan 11, the tape is urged into contact with the end portion 39 of the stationary brake member 38 and the tape movement is rapidly arrested.

When forward tape motion is again desired, the signal S is terminated to open the actuator 48 to the atmosphere. The brake 32 again assumes its normal rest position in which the brake members are below the surface area 25. The continuously applied tape tension urges the tape into contact with the rotating capstan 11 and motion is rapidly imparted to the tape.

FIGURE 5 illustrates the effect of the lifting action of the brake members 36, 37 . . . 38 on the tape 12 in the braking mode. Each of the brake members rides in its corresponding groove of the capstan 11, as shown. The action of each brake member temporarily causes the tape to deform slightly in an upward direction, such deformation having been exaggerated in the drawing for the sake of illustration. It will be noted that the maximum tape deformation occurs in line with the tape channels 1′, 2′ . . . 10′. If the tape is again run past the magnetic head 22, or if another magnetic head were positioned symmetrically opposite with respect to the head 22, these deformations would serve to bring the tape and the head into more intimate contact with each other in each channel, so as to enhance the recording and readout properties of the transport.

FIGURES 6*a* and 6*b* illustrate another embodiment of a brake member 62 which may be employed in the present invention corresponding to each capstan groove. The brake member 62 consists of a pair of substantially identical, co-operating parts 68 and 70 whose hooked ends 72 and 74 overlap each other in their rest position, as shown in FIGURE 6*b* and further include contoured corners 75 and 77. A pair of links 76 and 78 are coupled to the brake member parts 68 and 70 respectively by a pair of corresponding keyed shafts 80 and 82, so that any rotary motion applied to the links about the latter shafts is transmitted to the parts 68 and 70. A shaft 84 couples the links 76 and 78 together by engaging elongated slots in both to permit motion relative to the shaft.

FIGURE 7 illustrates the tape drive mode in which the brake member 62 assumes the normal rest position in the groove 1 of the capstan 11. The parts 68 and 70 of the brake member are seen to be disposed on opposite sides of the capstan. The hooked ends 72 and 74 overlap each other in the vicinity of the restricted area 25 of the capstan surface and are positioned below the latter. In this mode, driving contact between the surface area 25 and the tensioned magnetic tape (not shown) may be effected without interference from the hooked ends 72 and 74 of the brake member 62.

FIGURE 6*b* illustrates the braking mode in which the brake member 62 is in its actuated position. As shown, a force is applied in the direction of the arrow 34 to the shaft 84. The applied force drives the shaft 84 in an upward direction, causing the links 76 and 78 to rotate about the axes of the shafts 80 and 82 respectively. This motion is transmitted to the parts 68 and 70 of the brake member 62, which are keyed to the shafts 80 and 82 respectively. As a consequence, the hooked ends 72 and 74 move out of their overlapping relationship, as shown in the drawing.

When the brake member 62 is disposed in one of the circumferential grooves of the capstan 11, the hooked ends 72 and 74, in the position shown in FIGURE 6*b*, rise above the surface area 25 of the rotating capstan to lift the tensioned tape off the capstan surface thus bringing it to a halt. The contoured corners 75 and 77 remain out of contact with the tape to prevent damaging the latter. It will be understood, that a separate brake member 62 is positioned in each groove of the capstan 11, the shaft 84 to which force is applied connecting the corresponding links of all the brake members and a single pair of links may be employed to which the aforesaid force is applied.

From the foregoing explanation, it will be apparent that the present invention provides a tape transport which is simple in construction and operation and which is inexpensive to build. In addition, the temporary tape deformation is utilized to enhance the reliability of readout by bringing the tape into more intimate contact with the magnetic head. As a practical example, the tape channels may have a width of the order of 35 mils i.e. 70 mils on centers. The thickness $t$ of the brake members may be from 30 to 50 mils, with the capstan grooves slightly wider to accommodate the brake members without binding. The total travel of the brake from its rest position to the actuated position need be no greater than 10 mils so that a rapid change of position is possible.

Various modifications of the illustrated embodiments may now be made within the scope of the present invention. For example, the pneumatic actuator illustrated in the drawings is exemplary only and may be readily replaced by other actuators, such as electro-magnetic or magneto-strictive actuators. Similarly, the particular configuration of the brake members shown in the drawings represents a convenient implementation of the invention, but is not intended to be limiting with respect thereto. For example, each brake member may consist of a single hook whose end generally conforms to the curvature of the capstan in the vicinity of the area 25, successive brake members operating from opposite sides of the capstan. Other configurations readily come to mind, provided only that the portion of the tape member which lies in the groove below the tape is normally out of contact with the latter and can be selectively actuated to lift the tape off the capstan surface. Similarly, tape tension on both sides of the capstan need not be maintained by means of vacuum loop chambers, as shown, but may be brought about by various other means well known in the art.

The capstan itself must be capable of engaging the tape in driving relationship. To this end, the capstan lands, i.e. the raised areas between the grooves 1–10, may be surfaced in a special manner or may contain a friction material to enhance the driving contact with the tape. Alternatively, the aforesaid raised lands may contain perforations through which a vacuum is applied from within the capstan to hold the tape tightly against the surface of the latter.

From the foregoing explanation, it will be apparent that numerous modifications, changes and equivalents will now occur to those skilled in the art, all of which fall within the true spirit and scope contemplated by the invention.

What is claimed is:

1. In a tape transport, a rotatable cylindrical capstan adapted to engage a tape in driving contact with a portion of its surface, a plurality of circumferential grooves in said surface, a plurality of stationary U-shaped brake members each having a curvature at its closed end generally conforming to that of said capstan surface, each of said closed ends being positioned in one of said grooves below said surface portion, and means for jointly actuating said plurality of brake members to raise said closed ends above said surface portion and to lift said tape out of driving contact therewith.

2. In a tape transport, a pair of tape reels, a rotatable cylindrical capstan between said reels adapted to engage said tape in driving contact with a restricted area of the capstan surface, said capstan including a plurality of circumferential surface grooves, means on both sides of said capstan means for placing said tape under tension, tape brake means comprising a plurality of stationary brake members surrounding said capstan each lying at least partially in one of said grooves below said restricted surface area and generally conforming to the curvature of the latter, means coupling said plurality of brake members together, and means for actuating said coupling means to raise said members above said surface portion and to lift said tape off said surface area against said applied tension.

3. In a tape transport, a rotatable cylindrical capstan adapted to engage a magnetic tape in driving surface contact therewith, a plurality of surface grooves in said capstan each lying in a plane substantially normal to the capstan axis, tape brake means comprising a plurality of stationary, connected U-shaped members each riding in one of said grooves with at least a portion thereof below the capstan surface, and means for selectively raising said members above said surface to lift said tape out of contact therewith.

4. In a tape transport, a rotatable cylindrical capstan adapted to engage a multi-channel tape in driving contact with a restricted area of its surface, a plurality of circumferential grooves in said surface aligned with respective ones of said channels, a plurality of stationary brake members each surrounding said capstan and having a portion thereof positioned below said capstan surface portion in one of said grooves, and means for jointly raising said portion of said members above said restricted area to arrest the motion of said tape by lifting it out of contact with said surface portion.

5. In a tape transport, a rotatable cylindrical capstan adapted to engage a tape in driving contact with a portion of its surface, a plurality of circumferential grooves in said surface, a pair of stationary brake parts corresponding to each of said grooves, each of said pairs surrounding said capstan and having its ends positioned in the corresponding groove below said capstan surface portion, and means for simultaneously rocking each of said pairs to raise said ends above said surface portion in order to lift said tape out of driving contact therewith.

6. In a tape transport, a rotatable cylindrical capstan adapted to engage a tape in driving contact with a portion of the capstan surface, a plurality of circumferential grooves in said surface, a like plurality of stationary brake members each including a pair of cooperating parts surrounding said capstan, each of said pairs including overlapping ends substantially conforming to the curvature of said surface portion and lying at least partially below the latter in a corresponding groove, and means for simultaneously rocking said plurality of pairs to raise said ends above said surface portion and to lift said tape out of driving contact therewith.

7. In a transport for a multi-channel magnetic tape, a pair of tape reels, a rotatable cylindrical capstan positioned between said reels adapted to engage said tape in driving contact with a restricted area of its surface, said capstan including a plurality of circumferential surface grooves each aligned with one of said tape channels, means for applying tension to said tape on both sides of said capstan to effect said driving contact, a multi-core magnetic head positioned away from said capstan along the path of said tape and in line with said tape channel to transfer information between the latter and said magnetic head, a plurality of stationary brake members each corresponding to one of said grooves and including an end portion generally conforming to the curvature of said capstan surface, each of said brake members lying in its corresponding groove below said restricted surface area of said capstan, and means for jointly actuating said plurality of brake members to raise said end portions above said surface area, said raised end portions being adapted to engage said tape along said channels to lift it off said rotating capstan against said applied tension.

8. The apparatus of claim 7 wherein said brake members are generally U-shaped with the closed part constituting said end portion, the open-ended portions of all of said members being coupled to a common plate, said means for jointly actuating said brake members comprising means for selectively displacing said plate in a direction normal to the axis of said capstan.

9. The apparatus of claim 7 wherein each of said brake members constitutes a pair of substantially identical parts including hooked ends overlapping each other to form a general U-shaped configuration, the closed end of said configuration constituting said end portion, the straight ends of each pair being pivotably mounted, said means for jointly actuating said brake members comprising means selectively operative to impart a pivotal motion in opposite directions to each pair of parts until said hooked ends rise above said capstan surface area.

10. The apparatus of claim 7 wherein said means for applying tension to said tape comprise a loop chamber between said capstan and each of said tape reels, means for applying a vacuum to each of said chambers below the tape loop, said means for jointly activating said brake members comprising means selectively operated by said vacuum to impart a displacement to said brake members.

References Cited by the Examiner

UNITED STATES PATENTS

| | | | |
|---|---|---|---|
| 2,184,229 | 12/1939 | Spiess | 271—27 |
| 3,112,473 | 11/1963 | Wicklund | 226—95 X |

M. HENSON WOOD, Jr., *Primary Examiner.*

J. N. ERLICH, *Assistant Examiner.*